(12) United States Patent
Shi et al.

(10) Patent No.: US 8,072,960 B2
(45) Date of Patent: Dec. 6, 2011

(54) NETWORKING METHOD OF SINGLE FREQUENCY NETWORK IN TD-SCDMA SYSTEM

(75) Inventors: Yanshan Shi, Shanghai (CN); Ling Lv, Shanghai (CN); Jingdong Lin, Irvine, CA (US); Datong Chen, Fremont, CA (US)

(73) Assignee: Spreadtrum Communications, Inc., George Town, Grand Cayman (KY)

( * ) Notice: Subject to any disclaimer, the term of this patent is extended or adjusted under 35 U.S.C. 154(b) by 981 days.

(21) Appl. No.: 12/022,984

(22) Filed: Jan. 30, 2008

(65) Prior Publication Data

US 2009/0190547 A1   Jul. 30, 2009

(30) Foreign Application Priority Data

Jan. 30, 2007   (CN) .......................... 2007 1 0036963

(51) Int. Cl.
*H04J 3/00* (2006.01)
(52) U.S. Cl. ..................................... 370/345

(58) Field of Classification Search ................ None
See application file for complete search history.

(56) References Cited

U.S. PATENT DOCUMENTS

2004/0114574 A1*   6/2004   Zeira et al. ............... 370/352
* cited by examiner

*Primary Examiner* — Raj Jain

(57) ABSTRACT

A networking method of single frequency network in a TD-SCDMA system includes the steps of: (1) deciding a networking configuration scheme by a universal mobile telecommunications system terrestrial radio access network (UTRAN), (2) based on the decided networking configuration scheme, configuring an intra-frequency cell info list information element and an inter-frequency cell info list information element in system information and measurement control messages by the UTRAN, (3) transmitting signals over a servicing area by the UTRAN, and (4) receiving the system information and measurement control messages by a user equipment (UE) from the UTRAN, acquiring working mode configuration information of each frequency and each timeslot of a serving cell and neighboring cells, and judging whether there are duplicated cell information elements in the intra-frequency cell info list information element or the inter-frequency cell info list information element.

16 Claims, 4 Drawing Sheets

NETWORKING METHOD OF SINGLE FREQUENCY NETWORK IN TD-SCDMA SYSTEM

CROSS-REFERENCE TO RELATED APPLICATION(S)

This application claims priority to Chinese Patent Application No. 200710036963.7, filed on Jan. 30, 2007, the disclosure of which is incorporated herein by reference in its entirety.

TECHNICAL FIELD

The present invention relates generally to a $3^{rd}$ generation Universal Mobile Telecommunications System (UMTS). More particularly, the present invention relates to networking methods for a Single Frequency Network (SFN) in a TD-SCDMA system.

BACKGROUND

Traditional broadcasting networks, such as analog telecast systems, are Multi-Frequency Networks (MFN). These networks operate several transmitters each on different frequencies in different service areas to avoid interfering with one another. In MFN mode, a TV channel requires a large amount of frequency bandwidth to reach a large coverage and thus results in low spectral efficiency.

As spectrum resources become scarce, Single Frequency Network (SFN) becomes a hot spot. An SFN is created when all the transmitters in a network service area operate on the same carrier frequency. In an SFN, multiple transmitters over an area simultaneously transmit identical signals (simulcast) on the same physical resource (time, resource block). From the receiver (for example, the terminal) point of view, the received signal is indistinguishable from a single (cell) transmission. Delayed versions of the signal due to the multi-cell transmission are observed at the receiver. These delayed versions may be treated as multi-path components of the signal and can be combined in the receiver. By doing so, inter-cell interference can be transformed into useful signal energy, and the distribution of carrier to interference ratio across the coverage area is improved.

SFNs are primarily defined in terms of coverage areas (SFN areas), i.e., the set of cells that are participation in the simulcast transmissions. The cells and content in each SFN need to be tightly synchronized and coordinated.

SFN can work with multi-carrier modulation technique such as Orthogonal Frequency Division Multiplexing (OFDM). OFDM has been introduced into the Long Term Evolution (LTE) of 3GPP standards. The frame structure of LTE TDD (time division duplex) mode is similar to that of TD-SCDMA.

In CDMA systems operating in the SFN mode, signals from different base stations may be treated as multi-path components. This leads to a higher demand on mobile receivers to tolerate a higher delay spread of multi-path signals whose power levels are similar to that of the main-path signal. As a result, the time synchronization and the transmission synchronization among different base stations can have a significant impact on the receiving ability of mobile receivers.

Originally, streaming media is the transmission method for transmitting television programs over a mobile communication system. Compared to 2.5G techniques, 3G techniques provide higher data rate and support for higher spectral efficiency. 3G brings new chances to develop mobile television.

MBMS (Multimedia Broadcast Multicast Service) is introduced in 3GPP R6 in order to provide more multimedia services than streaming media. The main evolution of MBMS include a new network element of BM-SC, upgrade of existing network elements of PS domain for new MBMS interfaces (such as Gmb), new Channels (such as MICH, MTCH/MCCH/MSCH), new physical procedures (such as FACH channel selection combining, PTM and PTP handover), and new service procedure (such as subscription).

On the side of user equipment (UE), MBMS inherits from existing 3GPP standards as much as possible, except for a higher processing ability of base band.

TD-SCDMA is a part of 3G standards, which is an N-frequency system, i.e., a type of multi-carrier system. The number of carriers is N in a cell, and one of these carriers is the primary frequency, and the others (number of N–1) are secondary frequencies. The frequency used by UE is named the working frequency.

FIG. 1 shows a simplified example of a typical mobile communication system. The system has cells $100_1$-$100_Z$ (100), each cell composed of a NodeB (Base Station) $101_1$-$101_Z$ (101), and a number of UE $102_1$-$102_K$ (102). Each UE 102 connects with NodeB 101 in a serving cell 100 by a radio channel to communicate with other network elements. The direction from UE 102 to NodeB 101 is named the uplink, and from NodeB 101 to UE 102 is named the downlink. NodeB 101 is controlled by RNC (Radio Network Controller) 103. Together, NodeB 101, RNC 103, and some other network elements constitute the UTRAN (UMTS Terrestrial Radio Access Network) 110.

FIG. 2 shows the frame structure of a TD-SCDMA system. The structure is specified by 3GPP Technical Specification 25.221. The chip rate of TD-SCDMA is 1.28 Mcps. The time duration of each Radio Frame 200 is 10 ms identically divided into two sub-frames, $201_0$-$201_1$, (201). Time duration of each sub-frame is 5 ms, i.e., 6400 chips. A sub-frame includes 7 Timeslots (from TS0 to TS6) $202_0$-$202_6$, two pilot timeslots that are downlink pilot timeslot (DwPTS) 203 and uplink pilot timeslot 205, and a guard period (GP) 204. Furthermore, TS0 $202_0$ is used for downlink that carries only system broadcast channel and other downlink traffic channels. The six timeslots, from TS1 to TS6 $202_1$-$202_6$, are used to transmit downlink and uplink traffic channels. UpPTS 205 and DwPTS 203 are used for acquisitions of uplink and downlink synchronization, respectively. Time duration of these timeslots, from TS0 to TS6 $202_0$-$202_6$, are 0.675 ms, i.e., 864 chips. Each timeslot includes two data parts (Data Part 1 208 and Data Part 2 210), and a 144-chip long training sequence (midamble 209). Midamble 209 is important for channel estimation, cell identification, and other procedures in TS-SCDMA. DwPTS 203 includes a 32 chip long GP 211 and a 64 chip long downlink sync code (SYNC-DL) 206. UpPTS 205 includes a 128 chip long uplink sync code (SYNC-UL) 207. There is a switch point 212 in the six timeslots from TS1 to TS6 $202_1$-$202_6$ and is located between TS3 $202_3$ and TS4 $202_4$ when there are 3 uplink timeslots and 3 downlink timeslots.

In an N-Frequency TD-SCDMA system, over Secondary frequencies, TS0 $202_0$ and DwPTS 203 aren't transmitted in order to reduce co-channel interference between adjacent cells because of the omni transmission of TS0 and DwPTS signals without beam-forming.

FIG. 3 shows an example of a typical N-Frequency networking schematic, which is a 5 MHz networking with N equal to 3. There are 3 carriers in each cell, and one is the primary frequency 301, and the other two are secondary frequencies (302 and 303). TS1, TS2 and TS3 ($202_1$-$202_3$) are uplink timeslots; TS4, TS5 and TS6 ($202_4$-$202_6$) are downlink timeslots. Furthermore, the uplink/downlink ratio is configurable.

In an N-frequency scheme, in order to reduce co-channel interference, secondary frequencies (302 and 303) do not transmit DwPTS 203 and do not transmit pilot channel over TS0 $202_0$. Frequency planning should be used in order to avoid adjacent cells having the same primary frequency. Techniques such as frequency planning, antenna locating, and sector area dividing should may be used. The main frequency of the adjacent areas should be different.

In TD-SCDMA, smart antenna technique is important. The transmission methods of signal, such as omni transmission of broadcasting or transmission with beam-forming, can lead to different networking methods.

In existing 3GPP or TD-SCDMA technical specification, according to the status whether it is same as the working frequency of UE, a frequency is categorized as intra-frequency or inter-frequency. In the messages that UTRAN sends to UE, such as Measurement Control or System Information message, there are two frequency measurement lists—"Intra-frequency cell info list" and "Inter-frequency cell info list. Each element in these lists indicates "cell info" information element (IE). In addition to IEs in "Intra-frequency cell info list", elements in "Inter-frequency cell info list" includes a "Frequency info" IE. Therefore, the corresponding frequency of all "cell info" IE in "Intra-frequency cell info list" is the same as the working frequency of UE. There is no frequency information in "cell info" IE.

FIG. 4 shows an example of UTRAN sending the information of serving cell and neighboring cells to UE in different states. UTRAN 110 builds a SYSTEM INFORMATION 401 message and broadcasts the message. UE 102 receives this message in idle mode, and then updates local stored information according to the received message; if necessary, UE 102 can measure the Measurement Quantity specified by the message. UTRAN 110 also sends MEASUREMENT CONTROL 402 message to offer information of serving and neighboring cells to UE 102 in connection mode.

The SYSTEM INFORMATION 401 message and MEASUREMENT CONTROL 402 message include measurement object list, measurement quantity, and other information. Such information is classified into inter-frequency list and intra-frequency list. Tables 1~4 show some common IEs in the two messages in existing 3GPP and TD-SCDMA technical specifications.

Table 1 and Table 2 show parts of "Intra-frequency cell info list" IE 30 and "Inter-Frequency cell info list" IE 40, which inform UE 102 of the objects list of intra-frequency and inter-frequency, respectively.

TABLE 1

Parts of Intra-frequency cell info list IE

| Information Element/Group Name 30 | Multi | Type and reference | Semantics description |
|---|---|---|---|
| New intra-frequency cells 31 | 1 to <maxCellMeas> | | |
| >Intra-frequency cell id 32 | | Integer (0 ... <maxCellMeas>−1) | |
| >Cell info 33 | | | |

TABLE 2

Parts of Inter-frequency cell info list IE

| Information Element/Group Name 40 | Multi | Type and reference | Semantics description |
|---|---|---|---|
| New inter-frequency cells 41 | 1 to <maxCellMeas> | | |
| >Inter-frequency cell id 42 | | Integer (0..<maxCellMeas>−1) | |
| >Frequency info 43 | | | |
| >Cell info 33 | | | |

IE 30 is a structure array whose dimension is identified by "New intra-frequency cells" IE 31. Each element in the array includes two IEs, "Intra-frequency cell id" IE 32 and "Cell info" IE 33. The structure of IE 40 is similar to IE 30 while the main differences between them is that there is a "Frequency info" 43 IE in IE 40.

As to TD-SCDMA system, value of "maxCellMeas" equals 32. Table 3 shows the TDD parts of "Cell Info" IE 33 that pertains to cell information. "Primary CCPCH info" IE 51 provides information of P-CCPCH channel; "Timeslot list" IE 52 provides information of timeslot count maybe be measured by UE; "Timeslot number" IE 53 then indicates which timeslot should be measured.

Table 4 shows TDD parts of "Primary CCPCH info" IE 51. "Cell parameters ID" IE 61 provides identification information of primary frequency of a cell. The identification information is important for UE to distinguish the basic Midamble code and scramble code of a cell.

TABLE 3

TDD parts of Cell info IE

| Information Element/Group Name 33 | Multi | Type and reference | Semantics description |
|---|---|---|---|
| > Primary CCPCH info 51 | | | |
| > Primary CCPCH Tx power | | | |
| >Timeslot list 52 | 1 to <max TS. | | |
| >>Timeslot number 53 | | Integer (0 ... 6) | |

TABLE 4

TDD parts of Primary CCPCH info IE

| Information Element/Group Name 51 | Multi | Type and reference | Semantics description |
|---|---|---|---|
| >>Cell parameters ID 61 | | Integer(0 ... 127) | |

In TD-SCDMA systems, the following technical problems of applying SFN mode might be encountered:

The timeslot of a cell in SFN mode is the same as that of its neighboring cells. Thus, the timeslot should be transmitted unidirectionally and without beam-forming. Therefore, the same timeslot of neighboring cells could not work on an N-frequency mode for co-channel interference.

The "Cell parameters ID" of a timeslot in SFN mode configured by a cell must be the same as its neighboring cells. And the other timeslots of this cell working on N-frequency mode should apply cell-specific "Cell parameters ID". Thus, there are maybe two or more different "Cell parameters ID" in the same cell. However, a "Primary CCPCH info" IE 51 could only contain one "Cell parameters ID" IE 61.

UE could not distinguish if a timeslot is in SFN mode or in N-frequency mode.

In summary, existing N-frequency scheme of TD-SCDMA is not suitable for mobile TV services. SFN scheme can provide higher spectral efficiency. And existing messages between UTRAN and UE may not be suitable for information transmission of SFN configuration.

DETAILED DESCRIPTION

Figure 1:
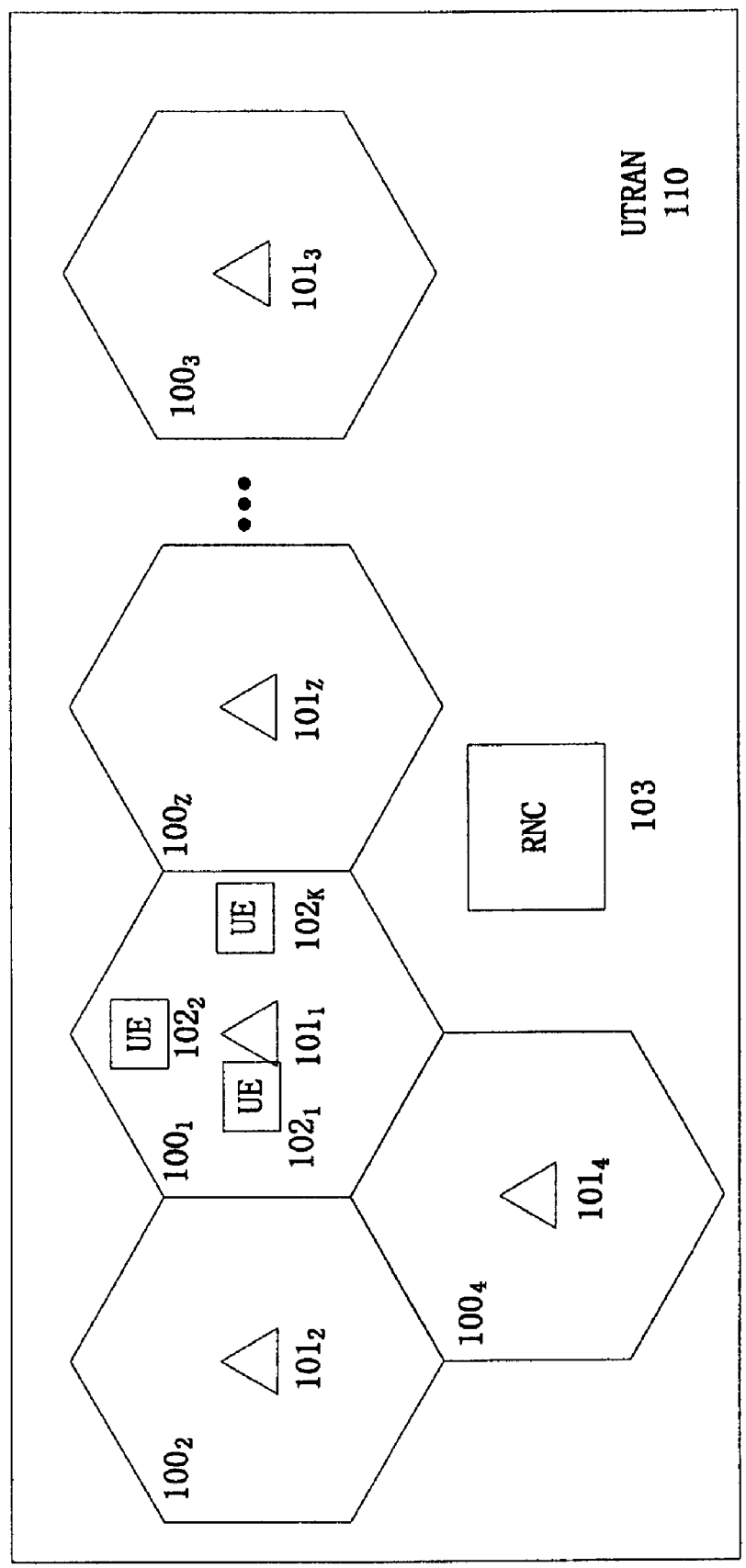
FIG. 1 shows a simplified example of a typical mobile communications system.
Figure 2:
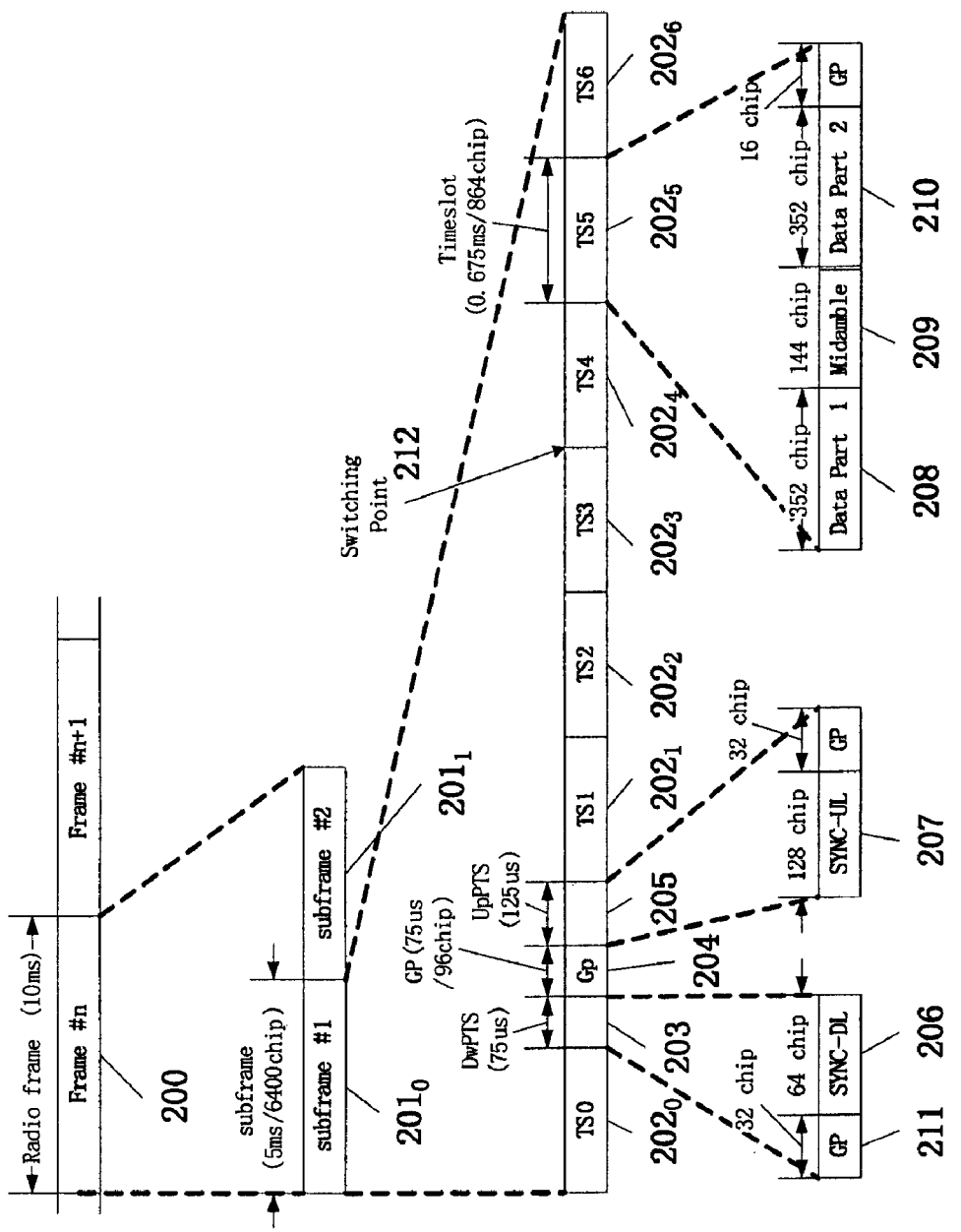
FIG. 2 shows the frame structure of a TD-SCDMA system.
Figure 3:
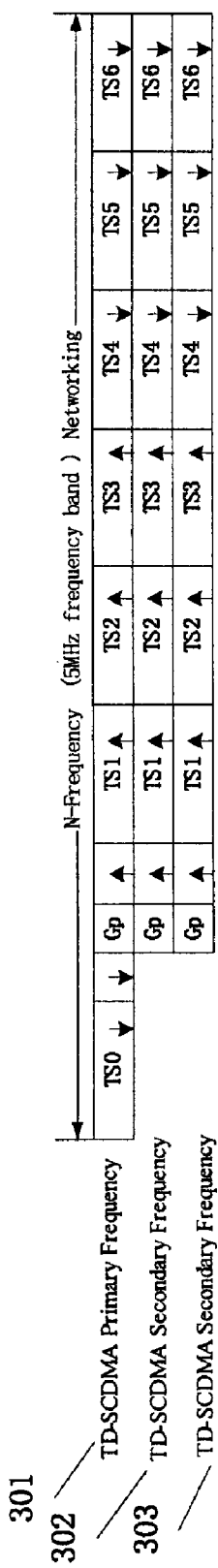
FIG. 3 shows an example of a typical N-Frequency (5 MHz) networking scheme.
Figure 4:
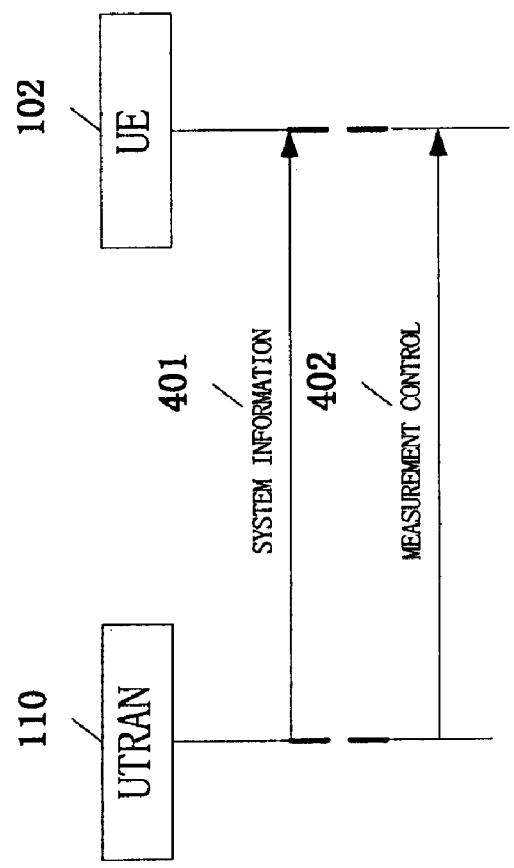
FIG. 4 shows an example of UTRAN sends the information of serving cell and neighboring cells to UE in different states.

The present invention provides methods and systems, in which SFN and N-frequency networks can coexist with each other in a network. As a result, a higher spectral efficiency can be achieved than a pure N-frequency network. Meanwhile, present invention provides compatible and flexible methods that the configuration information of SFN mode can be transmitted base on existing message information element structure. Even though the invention is described below using a TD-SCDMA system as an example, one skilled in the art would recognize that the invention can also be implemented and/or adapted to be used in other communication systems. As a result, the invention described below is not limited only to TD-SCDMA systems.

One embodiment of a method includes a SFN networking method in TD-SCDMA system. The method includes the following operations. Step A1: UTRAN 110 decides a networking configuration scheme including the physical resources working on N-frequency mode 504 or SFN mode 505 including the used frequencies and timeslot.

Step A2: Based on the configuration in step A1, UTRAN 110 configures the "Intra-frequency cell info list" IE 30 and "Inter-frequency cell info list" IE 40 in SYSTEM INFORMATION 401 and MEASUREMENT CONTROL 402 messages. The "Cell parameters Id" IE 61 is configured in "Cell Info" IE 33 of IE 30 and IE 40, and the timeslot number of the "Cell parameters Id" IE 61 is identified by "Timeslot number" IE 53.

Step A3: UTRAN 110 transmits signals over servicing area.

Step A4: UE 102 receives SYSTEM INFORMATION 401 and MEASUREMENT CONTROL 402 messages from UTRAN 110, acquires the working mode configuration information of each frequency and each timeslot of serving cell and neighboring cells, and judges whether there are duplicated "Cell Info" IE 33 in "Intra-frequency cell info list" IE 30 or "Inter-frequency cell info list" IE 40. This step also includes the following operations:

Step A4.1: If the result of the judgment is "Yes", over the corresponding frequency of "Cell Info" IE 33, UE 102 can affirm timeslot identified by "Timeslot Number" IE 53 as working on SFN mode 505.

Step A4.2: If the result of the judgment is "No", over the corresponding frequency of "Cell Info" IE 33, UE 102 can affirm timeslot identified by "Timeslot Number" IE 53 as working on N-frequency mode 504.

In Step A1, the principles of networking scheme include:

A1.1: The division between the physical resource of N-Frequency mode 504 and SFN mode 505 can be time or frequency, i.e., one unit of physical channel resource can not work on both of these two modes at the same time and the same frequency.

A1.2: Physical resources working on SFN mode 505 of a cell is identical to the resources of its neighboring cells.

A1.3: There is at least one TS0 timeslot 509 working on N-frequency mode each cell.

A1.4: Timeslots of SFN mode work on downlink direction only, i.e., the direction from UTRAN 110 to UE 102.

A1.5: If TS0 timeslot 604 works on SFN mode, DwPTS timeslot 605 of the same cell and same frequency works on SFN mode too.

A1.6: In a cell, configuration of count of timeslot working on SFN mode of a frequency is independent of the configuration of another frequency, i.e., counts of timeslot working on SFN mode can be different or same between different frequencies.

A1.7: Configuration of working mode of a downlink timeslot is independent of the working mode of another timeslot, i.e., working mode of a timeslot is not dependent on mode of another timeslot.

A1.8: The multiple access schemes of timeslots working on SFN mode 505. The multiple access schemes can be CDMA or OFDMA.

In Step A2, the operations also include the following:

A2.1: Either SFN mode 505 or N-frequency mode 504, working mode of timeslots, identified by "Timeslot number" IE 53 in a "Cell info" IE 33, may be the same.

A2.2: If a "Cell parameters ID" IE 61 is used by SFN mode 505, in "New intra-frequency cells" IE 31 or "New inter-frequency cells" IE 41 lists, the "Cell info" IE 33 including this IE 61 should be duplicated once and only once.

In Step A3, the operations also include the followings:

A3.1: UTRAN 110 broadcasts SYSTEM INFORMATION 401 message over its serving area using the TS0 timeslot 509 working on N-frequency mode, and transmits MEASUREMENT CONTROL 402 message to UE 102 in connection mode.

A3.2: Except for the pilot channel over TS0 timeslot 509, timeslots working on N-frequency mode 504 can be transmitted with beam-forming.

A3.3: Timeslots working on SFN mode 505 can be transmitted without beam-forming.

A3.4: Signals transmitted over timeslots working on SFN mode 505 of a cell can be identical with signals over the same timeslots and same frequency of neighboring cells.

A3.5: Service information of broadcasting or multicast about timeslot working on SFN mode 505 are transmitted over the TS0 timeslot 509 working on N-frequency mode 504, or over the physical channels identified by the broadcasting messages on this TS0 timeslot 509.

The method can also include the following Step A5:

Step A5: UE 102 receives the messages of Step A3.5, acquires the service information about timeslots working on SFN mode 505, transmits them to Man Machine Interface (MMI), and then provides options to a user to subscribe these services. If the user choices "Yes", the step also including the following:

A5.1: UE 102 begins the Authentication and Certification procedure of these services over SFN based on the service information.

A5.2: UE 102 receives traffic data from SFN timeslots 505.

If the services over SFN don not need Authentication and Certification, the step A5.1 can be skipped.

According to several embodiments of the present invention, in a TD-SCDMA system, SFN and N-frequency network can coexist with each other by a flexible network planning. The physical resource working between the two modes can be adjusted dynamically. Meanwhile, present invention provides a compatible and flexible method that the configuration information of SFN mode can be transmitted base on existing message information element structure.

Figure 5:
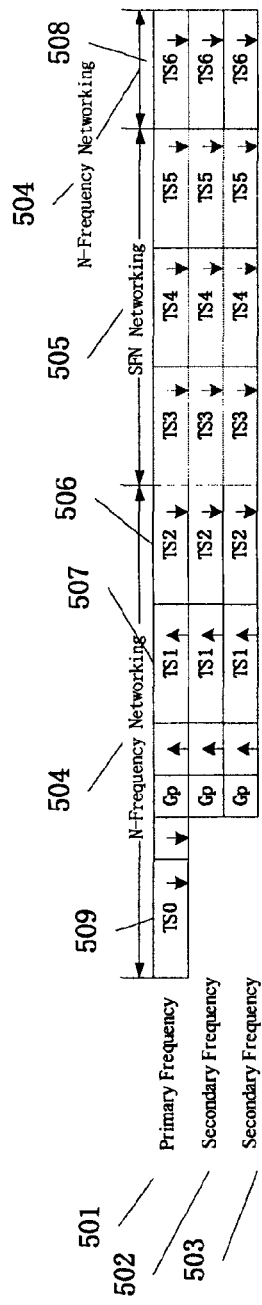
FIG. 5 shows the Time Division of N-Frequency timeslots and SFN timeslots according to some embodiments of the present invention.

FIG. 5 shows the Time Division of N-Frequency timeslots and SFN timeslots according to some embodiments of the present invention.

In an existing N-frequency network, there are 3 frequencies within 5 MHz bandwidth of each cell, including one primary frequency 501 and two secondary frequencies 502 and 503. Timeslots from TS0 to TS2 work on N-frequency mode, from TS3 to TS5 work on SFN mode, and TS6 works on N-frequency. On every frequency, TS2 timeslot 506 and TS6 timeslot 508 are downlink timeslots, TS1 timeslot 507 is the uplink one. Broadcasting channel is allocated in TS0 timeslot 509 working on N-frequency. SYSTEM INFORMATION 401 message is transmitted by TS0 timeslot 509, and the mobile television programs are transmitted by timeslots 505 working on SFN mode. UE completes the authentication and certification procedures of these SFN services by the uplink timeslot 507, and the downlink timeslots 506 and 508.

Figure 6:
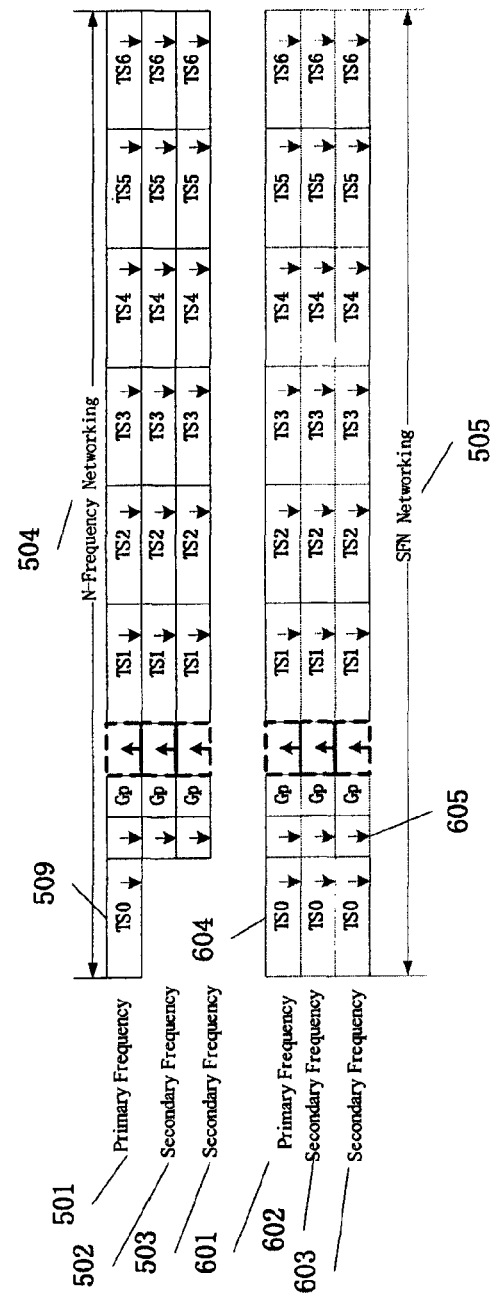
FIG. 6 shows the Frequency Division of N-Frequency timeslots and SFN timeslots according to some embodiments of the present invention.

As shown in FIG. 6, SFN mode and N-frequency mode are divided by frequency. Some extra secondary frequencies 601, 602, and 603 are working on SFN mode; and frequencies 501, 502 and 503 are working on N-frequency mode.

The networking method of these described embodiments include:

Step A1: UTRAN 110 decides a networking configuration scheme including the physical resources (e.g., the used frequencies and timeslot) working on N-frequency mode 504 or SFN mode 505.

A1.1: The way of division between the physical resource of N-Frequency mode 504 and SFN mode 505 can be time or frequency, i.e., one unit of physical channel resource can not work on both of these two modes at the same time and at the same frequency.

A1.2: Physical resources working on SFN mode 505 of a cell is identical to the resources of its neighboring cells.

A1.3: There is at least one TS0 timeslot 509 working on N-frequency mode each cell.

A1.4: Timeslots of SFN mode work on downlink direction only, i.e., the direction from UTRAN 110 to UE 102.

A1.5: If TS0 timeslot 604 works on SFN mode, DwPTS timeslot 605 of the same cell and same frequency works on SFN mode too.

A1.6: In a cell, count of timeslot working on SFN mode of a frequency can be different than other frequencies.

A1.7: All downlink timeslots of a frequency can all work on SFN mode or on N-frequency mode.

A1.8: On a frequency, timeslots working on SFN mode 505 can be discontinuous in a sub-frame. A SFN timeslot can be inserted into two N-frequency timeslots.

A1.9: On a frequency, timeslots working on N-frequency mode 504 can be discontinuous in a sub-frame. An N-frequency timeslot can be inserted into two SFN timeslots.

A1.10: The multiple access schemes of timeslots working on SFN mode 505 can be CDMA or OFDMA.

Step A2: Based on the configuration in step A1, UTRAN 110 configures the "Intra-frequency cell info list" IE 30 and "Inter-frequency cell info list" IE 40 in SYSTEM INFORMATION 401 and MEASUREMENT CONTROL 402 messages. The "Cell parameters Id" IE 61 is configured in "Cell Info" IE 33 of IE 30 and IE 40, and the timeslot number of the "Cell parameters Id" IE 61 is identified by "Timeslot number" IE 53.

Step A2 also includes the following:

A2.1: Either SFN mode 505 or N-frequency mode 504, working mode of timeslots, as identified by "Timeslot number" IE 53 in a "Cell info" IE 33, must be the same.

A2.2: If a "Cell parameters ID" IE 61 is used by SFN mode 505, in "New intra-frequency cells" IE 31 or "New inter-frequency cells" IE 41 lists, the "Cell info" IE 33 including this IE 61 may be duplicated once and only once.

Step A3 UTRAN 110 transmits signals over servicing area and includes the followings:

A3.1: UTRAN 110 broadcasts SYSTEM INFORMATION 401 message over the serving area using the TS0 timeslot 509 working on N-frequency mode, and transmits MEASUREMENT CONTROL 402 message to UE 102 in connection mode.

A3.2: Except for the pilot channel over TS0 timeslot 509, timeslots working on N-frequency mode 504 can be transmitted with beam-forming.

A3.3: Timeslots working on SFN mode 505 can be transmitted without beam-forming.

A3.4: Signals transmitted over timeslots working on SFN mode 505 of a cell is identical with signals over the same timeslots and same frequency of neighboring cells.

A3.5: Service information of broadcasting or multicast about timeslot working on SFN mode 505 are transmitted over the TS0 timeslot 509 working on N-frequency mode 504, or over the physical channels identified by the broadcasting messages on this TS0 timeslot 509.

Step A4: UE 102 receives SYSTEM INFORMATION 401 and MEASUREMENT CONTROL 402 messages from UTRAN 110, acquires the working mode configuration information of each frequency and each timeslot of serving cell and neighboring cells, and judges whether there are duplicated "Cell Info" IE 33 in "Intra-frequency cell info list" IE 30 or "Inter-frequency cell info list" IE 40. This operation can also include the following:

Step A4.1: If the result of the judgment is "Yes", over the corresponding frequency of "Cell Info" IE 33, UE 102 can affirm timeslot identified by "Timeslot Number" IE 53 as working on SFN mode 505.

Step A4.2: If the result of the judgment is "No", over the corresponding frequency of "Cell Info" IE 33, UE 102 can affirm timeslot identified by "Timeslot Number" IE 53 as working on N-frequency mode 504.

Step A5: UE 102 receives the messages of Step A3.5, acquires the service information about timeslots working on SFN mode 505, transmits them to Man Machine Interface (MMI), and then provides options to users to subscribe these services or not. If user choices "Yes", the step also including the followings:

A5.1: UE 102 begins the Authentication and Certification procedure of these services over SFN based on the service information.

A5.2: UE 102 receives traffic data from SFN timeslots 505.

If the services over SFN need not Authentication and Certification, Step A5.1 can be skipped.

In some embodiments, the count of timeslots working on SFN mode can be different between different frequencies, but should be same on a same frequency between different cells.

A number of implementations of the invention have been described. Nevertheless, it will be understood that various modifications may be made without departing from the spirit and scope of the invention. Accordingly, other implementations are within the scope of the following claims.

We claim:

1. A single frequency network (SFN) networking method in a time division-synchronous code division multiple access (TD-SCDMA) system, comprising the steps of:

(A) deciding a networking configuration scheme by a universal mobile telecommunications system terrestrial radio access network (UTRAN) comprising deciding physical channel resources comprising frequencies and timeslots working at an N-frequency mode or a single frequency network (SFN) mode, wherein a time division or frequency division is provided between the physical channel resources of the N-frequency mode and those of the SFN mode, so that each of the physical channel resources is not able to work on both of the N-frequency mode and the SFN mode at the same time and at the same frequency, wherein the physical channel resources working at the SFN mode of a cell is identical to the physical channel resources working at the SFN mode of its neighboring cells, wherein each cell has at least a first TS0 timeslot working at the N-frequency mode, wherein the timeslots of the SFN mode works at a downlink direction from the UTRAN to the UE, wherein if a second TS0 timeslot works at the SFN mode, a downlink pilot timeslot (DwPTS) of the same cell and the same frequency works at the SFN mode too, wherein the number of timeslots working at the SFN mode is independently configured among different frequencies in a same cell, so that the number of timeslots of the SFN mode at a frequency is independent of the number of timeslots of the SFN mode at another frequency, wherein a working mode of each of all downlink timeslots at a frequency is independently configured, so that whether a timeslot works at a certain mode is independent of a working mode of a last and next timeslot, wherein the timeslots working at the SFN mode use a multiple access mode;

(B) based on the decided networking configuration scheme, configuring an intra-frequency cell info list information element and an inter-frequency cell info list information element in system information and measurement control messages by the UTRAN, wherein each of the intra-frequency cell info list information element and the inter-frequency cell info list information element comprises a cell information element, wherein a cell parameters identity (ID) information element is configured in the cell information element, and a timeslot number of the cell parameters ID information element is identified by a timeslot number information element in the cell information element;

(C) transmitting signals over a servicing area by the UTRAN; and (D) receiving the system information and measurement control messages by a user equipment (UE) from the UTRAN, acquiring working mode configuration information of each frequency and each timeslot of a serving cell and neighboring cells, and judging whether there are duplicated cell information elements in the intra-frequency cell info list information element or the inter-frequency cell info list information element, wherein if a result of the judgment is yes, at a corresponding frequency of the cell information element, the UE affirms that the timeslot identified by the timeslot number information element works at the SFN mode, wherein if a result of the judgment is no, at a corresponding frequency of the cell information element, the UE affirms that the timeslot identified by the timeslot number information element works at the N-frequency mode.

2. The SFN networking method, as recited in claim 1, wherein in step (A), the multiple access mode is code division multiple access (CDMA) or orthogonal frequency division multiple access (OFDMA).

3. The SFN networking method, as recited in claim 1, wherein in step (B), the timeslots identified by the timeslot number information element in the cell information element are at a same working mode, namely, the SFN mode or the N-frequency mode, wherein in step (B), if a cell parameters ID information element is used by the SFN mode, in a new intra-frequency cells information element list or a new inter-frequency cells information element list, the cell information element comprising the cell parameters ID information element is duplicated once and only once.

4. The SFN networking method, as recited in claim 2, wherein in step (B), the timeslots identified by the timeslot number information element in the cell information element are at a same working mode, namely, the SFN mode or the N-frequency mode, wherein in step (B), if a cell parameters ID information element is used by the SFN mode, in a new intra-frequency cells information element list or a new inter-frequency cells information element list, the cell information element comprising the cell parameters ID information element is duplicated once and only once.

5. The SFN networking method, as recited in claim 1, wherein the step (C) comprises broadcasting the system information message over the serving area and transmitting the measurement control message to the UE at the connection mode using the first TS0 timeslot working at the N-frequency mode by the UTRAN, wherein except for a beacon channel of the first TS0 timeslot, the timeslots working at the N-frequency mode are transmitted with beam-forming, wherein the timeslots working at the SFN mode are transmitted without beam-forming, wherein for the timeslots working at the SFN mode, at a same frequency and a same timeslot, transmitted signals of a cell are identical with those of neighboring cells, wherein service information of broadcasting or multicasting about the timeslots working at the SFN mode are transmitted by the first TS0 timeslot working at the N-frequency mode, or by the physical channels identified by the broadcasting messages on the first TS0 timeslot.

6. The SFN networking method, as recited in claim 2, wherein the step (C) comprises broadcasting the system information message over the serving area and transmitting the measurement control message to the UE at the connection mode using the first TS0 timeslot working at the N-frequency mode by the UTRAN, wherein except for a beacon channel of the first TS0 timeslot, the timeslots working at the N-frequency mode are transmitted with beam-forming, wherein the timeslots working at the SFN mode are transmitted without beam-forming, wherein for the timeslots working at the SFN mode, at a same frequency and a same timeslot, transmitted signals of a cell are identical with those of neighboring cells, wherein service information of broadcasting or multicasting about the timeslots working at the SFN mode are transmitted by the first TS0 timeslot working at the N-frequency mode, or by the physical channels identified by the broadcasting messages on the first TS0 timeslot.

7. The SFN networking method, as recited in claim 3, wherein the step (C) comprises broadcasting the system information message over the serving area and transmitting the measurement control message to the UE at the connection mode using the first TS0 timeslot working at the N-frequency mode by the UTRAN, wherein except for a beacon channel of the first TS0 timeslot, the timeslots working at the N-frequency mode are transmitted with beam-forming, wherein the timeslots working at the SFN mode are transmitted without beam-forming, wherein for the timeslots working at the SFN mode, at a same frequency and a same timeslot, transmitted signals of a cell are identical with those of neighboring cells, wherein service information of broadcasting or multicasting about the timeslots working at the SFN mode are transmitted by the first TS0 timeslot working at the N-frequency mode, or by the physical channels identified by the broadcasting messages on the first TS0 timeslot.

8. The SFN networking method, as recited in claim 4, wherein the step (C) comprises broadcasting the system information message over the serving area and transmitting the measurement control message to the UE at the connection mode using the first TS0 timeslot working at the N-frequency mode by the UTRAN, wherein except for a beacon channel of the first TS0 timeslot, the timeslots working at the N-frequency mode are transmitted with beam-forming, wherein the timeslots working at the SFN mode are transmitted without beam-forming, wherein for the timeslots working at the SFN mode, at a same frequency and a same timeslot, transmitted signals of a cell are identical with those of neighboring cells, wherein service information of broadcasting or multicasting about the timeslots working at the SFN mode are transmitted by the first TS0 timeslot working at the N-frequency mode, or by the physical channels identified by the broadcasting messages on the first TS0 timeslot.

9. The SFN networking method, as recited in claim 5, further comprising acquiring the service information about the timeslots working at the SFN mode in step (C) by the UE, transmitting the service information to a man machine interface (MMI), and providing options to a user to subscribe to these services, wherein if the user chooses "Yes", the UE receives business data from the SFN mode.

10. The SFN networking method, as recited in claim 6, further comprising acquiring the service information about the timeslots working at the SFN mode in step (C) by the UE, transmitting the service information to a man machine interface (MMI), and providing options to a user to subscribe to these services, wherein if the user chooses "Yes", the UE receives business data from the SFN mode.

11. The SFN networking method, as recited in claim 7, further comprising acquiring the service information about the timeslots working at the SFN mode in step (C) by the UE, transmitting the service information to a man machine interface (MMI), and providing options to a user to subscribe to these services, wherein if the user chooses "Yes", the UE receives business data from the SFN mode.

12. The SFN networking method, as recited in claim 8, further comprising acquiring the service information about the timeslots working at the SFN mode in step (C) by the UE, transmitting the service information to a man machine interface (MMI), and providing options to a user to subscribe to these services, wherein if the user chooses "Yes", the UE receives business data from the SFN mode.

13. The SFN networking method, as recited in claim 9, wherein if the user chooses "Yes", before receiving business data from the SFN mode, the UE begins an authentication and certification procedure of the services of the SFN based on the service information.

14. The SFN networking method, as recited in claim 10, wherein if the user chooses "Yes", before receiving business data from the SFN mode, the UE begins an authentication and certification procedure of the services of the SFN based on the service information.

15. The SFN networking method, as recited in claim 11, wherein if the user chooses "Yes", before receiving business data from the SFN mode, the UE begins an authentication and certification procedure of the services of the SFN based on the service information.

16. The SFN networking method, as recited in claim 12, wherein if the user chooses "Yes", before receiving business data from the SFN mode, the UE begins an authentication and certification procedure of the services of the SFN based on the service information.

* * * * *